Patented Feb. 2, 1932

1,843,316

UNITED STATES PATENT OFFICE

KARL DAIMLER, OF HOCHST-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

DETERGENT

No Drawing. Application filed October 25, 1927, Serial No. 228,693, and in Germany October 27, 1926.

The present invention relates to detergent products in solid form made from salts of sulfonic acids of alkylated aromatic hydrocarbons and organic solvents and to a process of preparing the same.

It is a surprising fact that, unlike for instance sodium naphthalenesulfonate and the like, the alkali metal salts and ammonium salts of the sulfonic acids of alkylated and cycloalkylated aromatic hydrocarbons, such as for instance of butyl-naphthalene, butyl-benzene, isopropylxylene, dibutyl-tetrahydronaphthalene, cyclohexylnaphthalene and the like, very readily dissolve, particularly when heated in any concentration in hydroaromatic solvents, such as terpenes and related compounds and also in various other organic solvents, such as, for instance, diacetone alcohol, 1.3-butyleneglycol, the benzine fractions having a boiling point between about 80° C. and 200° C., tetrachlorethane, solvent-naphtha obtainable by coal tar distillation and the like, without the addition of water.

I have now found that by proceeding on the lines indicated by the above mentioned observations, and avoiding too large an excess of the solvent, that is to say such a quantity of the solvent as would cause the mass to remain liquid at ordinary temperature, and, if required, applying a water-binding agent such as for instance calcined sodium carbonate or an agent of similar action, such as pumice stone powder or kaolin, products are obtained which can be kneaded or are even liquid while hot, but which in the cold, in spite of their considerable content of solvents, become solid. The products are stable solids, a form in which they can be very easily handled in the trade. The said solid products can be moulded or pulverized according to their constitution, and give on addition of water clear to milky solutions which can be used for a great variety of purposes, in particular in the textile industry as a purifying agent. The addition of water depends entirely on the purpose for which the solutions or emulsions are to be used. A mixture composed of two parts of the solid product and 98 parts of water is suitable, for instance, as a detergent agent. The solutions and emulsions thus produced act in the same way as the already known solutions and emulsions of similar compositions, for instance, when being used as washing, wetting and equalizing agents.

Heretofore compositions of organic solvents and salts of sulfonic acids of alkylated aromatic hydrocarbons were prepared from water solutions of the said salts and therefore existed only in liquid form whereas by the process of my present invention it is possible to prepare highly concentrated solid products, the handling, packing and transport of which causes much less expense.

The following examples illustrate my invention, but they are not intended to limit it thereto, the parts being parts by weight:

1. 200 parts of sodium butylnaphthalenesulfonate (obtainable from one molecule of naphthalene, 1.3 molecules of n-butylalcohol, 2 molecules of chlorosulfonic acid and the quantity of caustic soda lye required for the neutralization of the sulfonation product) and 50 parts of dipentene (a by-product obtained in the manufacture of camphor from turpentine oil) are kneaded at about 90° C. in a mixing apparatus provided with a heating device and the resulting mass is either pressed, while hot, into frame-moulds or it is allowed to cool and then cut into pieces or pulverized. The product can be used as soap for washing and for various purposes in the textile industry, and so on.

2. 200 parts of sodium isopropylnaphthalenesulfonate (obtainable from one molecule of naphthalene, 1,2 molecules of isopropylalcohol, 1,8 molecules of chlorosulfonic acid and the quantity of caustic soda solution required for the neutralization), 50 parts of dipentene and 30 parts of ammonium sulfate are worked up as set forth in Example 1. The resulting product is particularly useful as auxiliary material in wool dyeing.

3. If the dipentene as used in Example 1 is replaced by 1.3-dioxybutane (1.3-butyleneglycol), there are also obtained solid products which are very suitable for being used as wetting or equalizing agents in wool dyeing.

Similar products are obtained by using for instance tetrachlorethane or mixtures of the above mentioned solvents. If for the sodium butylnaphthalenesulfonate is wholly or partly substituted the corresponding ammonium salt or the salts of the butyltetralinsulfonic acid, a like result is obtained.

4. A washing powder, having the property of dissolving fats as well as that of slightly bleaching, is obtained in a particularly easy manner by the following reaction:

300 parts of a solution of sodium butylnaphthalenesulfonate of 50% strength and 60 parts of oil of turpentine are mixed and stirred at 50° C. with 270 parts of calcined sodium carbonate and the mixture is allowed to cool and solidify. During this operation the water contained in the mixture is bound as water of crystallization by the sodium carbonate and the sulfonate, which thus becomes dehydrated, then dissolves in the turpentine oil whereby a solid product is formed, which is used in the form of lumps or of a powder. Instead of the sodium butylnaphthalenesulfonate there may be employed with the same result the cyclohexylnaphthalenesulfonate prepared in a like manner by means of cyclohexanol.

5. A mixture composed of 200 parts of sodium or ammonium dibutylnaphthalenesulfonate and 600 parts of pumice-stone powder or kaolin is mixed and stirred with 200 parts of turpentine oil. The voluminous powder thus obtained is pressed into tin-boxes so that it can be easily transported. The mass, which after being taken out from the box, can be again easily crushed and on being made into a paste by addition of water it can be utilized as a means for cleaning and bleaching soiled parquetry floors.

In the following claims the term "alkylated aromatic hydrocarbons" is to be understood to comprise bodies such for instance as butylnaphthalene, isopropylxylene, cyclohexylnaphthalene, dibutyltetrahydronaphthalene and the like, and the term "alkali metal salts" to comprise also the ammonium salts.

I claim:

1. A detergent product in solid form consisting of 200 parts by weight of sodium butylnaphthalene sulfonate, 50 parts by weight of dipentene and 180 parts by weight of calcined sodium carbonate.

2. A detergent product in solid form comprising an alkali metal salt of a sulfonic acid of an alkylated aromatic hydrocarbon and an organic solvent selected from the group consisting of terpene, diacetone alcohol, 1.3-butyleneglycol, tetrachlorethane, solvent-naphtha and benzine fractions having a boiling point between about 80° C. and 200° C., the quantity of said solvent amounting to 20% of the whole product.

3. A detergent product in solid form comprising an alkali metal salt of a sulfonic acid of an alkylated hydrocarbon of the naphthalene series and an organic solvent selected from the group consisting of terpene, diacetone alcohol, 1.3-butyleneglycol, tetrachlorethane, solvent-naphtha and benzine fractions having a boiling point between about 80° C. and 200° C., the quantity of said solvent amounting to 20% of the whole product.

4. A detergent product in solid form comprising a sodium butylnaphthalene sulfonate and an organic solvent selected from the group consisting of terpene, diacetone alcohol, 1.3-butyleneglycol, tetrachlorethane, solvent-naphtha and benzine fractions having a boiling point between about 80° C. and 200° C., the quantity of said solvent amounting to 20% of the whole product.

5. A detergent product in solid form comprising an alkali metal salt of a sulfonic acid of an alkylated aromatic hydrocarbon, an organic solvent selected from the group consisting of terpene, diacetone alcohol, 1.3-butyleneglycol, tetrachlorethane, solvent-naphtha and benzine fractions having a boiling point between about 80° C. and 200° C., the quantity of which amounts to 20% of the whole product, and an agent capable of binding water as water of crystallization.

6. A detergent product in solid form comprising an alkali metal salt of a sulfonic acid of an alkylated hydrocarbon of the naphthalene series, an organic solvent selected from the group consisting of terpene, diacetone alcohol, 1.3-butyleneglycol, tetrachlorethane, solvent-naphtha and benzine fractions having a boiling point between about 80° C. and 200° C., the quantity of which amounts to 20% of the whole product, and an agent capable of binding water as water of crystallization.

7. A detergent product in solid form comprising a sodium butylnaphthalene sulfonate, an organic solvent selected from the group consisting of terpene, diacetone alcohol, 1.3-butyleneglycol, tetrachlorethane, solvent-naphtha and benzene fractions having a boiling point between about 80° C. and 200° C., the quantity of which amounts to 20% of the whole product, and an agent capable of binding water as water of crystallization.

In testimony whereof, I affix my signature.

KARL DAIMLER.